(12) United States Patent
Ko et al.

(10) Patent No.: US 10,381,698 B2
(45) Date of Patent: Aug. 13, 2019

(54) METAL AIR BATTERY HAVING AIR PURIFICATION MODULE, ELECTROCHEMICAL CELL HAVING AIR PURIFICATION MODULE AND METHOD OF OPERATING METAL AIR BATTERY

(71) Applicant: SAMSUNG ELECTRONICS CO., LTD., Suwon-si, Gyeonggi-do (KR)

(72) Inventors: Jeongsik Ko, Seongnam-si (KR); Hyukjae Kwon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 449 days.

(21) Appl. No.: 15/136,063

(22) Filed: Apr. 22, 2016

(65) Prior Publication Data

US 2016/0322686 A1    Nov. 3, 2016

(30) Foreign Application Priority Data

Apr. 29, 2015 (KR) .......................... 10-2015-0060723
Nov. 18, 2015 (KR) .......................... 10-2015-0161723

(51) Int. Cl.
| | |
|---|---|
| *B01D 53/04* | (2006.01) |
| *H01M 8/06* | (2016.01) |
| *H01M 12/08* | (2006.01) |
| *H01M 12/02* | (2006.01) |
| *H01M 4/38* | (2006.01) |
| *H01M 8/0662* | (2016.01) |
| *H01M 8/0668* | (2016.01) |

(52) U.S. Cl.
CPC ........... *H01M 12/08* (2013.01); *H01M 4/382* (2013.01); *H01M 12/02* (2013.01); *H01M 8/0662* (2013.01); *H01M 8/0668* (2013.01); *H01M 8/0687* (2013.01); *Y02E 60/128* (2013.01)

(58) Field of Classification Search
CPC .... B01D 53/04; B01D 53/047; B01D 53/225; B01D 53/226; Y02E 60/128; H01M 4/382; H01M 8/0662; H01M 8/0668; H01M 8/0687; H01M 12/02; H01M 12/08
USPC ........ 96/9, 111, 132; 95/8, 43, 96, 117, 130; 429/402, 403, 407, 410, 413
See application file for complete search history.

(56) References Cited

U.S. PATENT DOCUMENTS

| | | | | |
|---|---|---|---|---|
| 6,797,027 | B2* | 9/2004 | Stenersen | .......... B01D 46/0023 429/410 |
| 7,306,658 | B2* | 12/2007 | White | .................... B01D 53/02 96/132 |
| 9,564,645 | B2* | 2/2017 | Ito | ........................ H01M 2/345 |
| 2003/0170527 | A1* | 9/2003 | Finn | .................. H01M 8/04022 429/410 |

(Continued)

FOREIGN PATENT DOCUMENTS

EP    2775560 A1    9/2014

*Primary Examiner* — Frank M Lawrence, Jr.
(74) *Attorney, Agent, or Firm* — Cantor Colburn LLP

(57) ABSTRACT

A metal air battery includes an air purification module which communicates fluid to a battery cell module, purifies air flowing from an outside, and supplies the purified air to the battery cell module. The air purification module includes: a first air purifier which filters a first impurity of a plurality of impurities in the air flowing from the outside; and a second air purifier which filters a second impurity of the plurality of impurities, which is different from the first impurity.

25 Claims, 10 Drawing Sheets

(56) References Cited

U.S. PATENT DOCUMENTS

| | | | |
|---|---|---|---|
| 2006/0123989 A1* | 6/2006 | Karichev | B01D 53/04 |
| | | | 95/139 |
| 2013/0011753 A1 | 1/2013 | Noda | |
| 2013/0106359 A1* | 5/2013 | Noda | H01M 8/0668 |
| | | | 320/128 |
| 2014/0045080 A1 | 2/2014 | Albertus et al. | |
| 2014/0234731 A1 | 8/2014 | Lohmann et al. | |
| 2015/0024291 A1 | 1/2015 | Ito et al. | |
| 2015/0078964 A1* | 3/2015 | Meirav | B01J 20/28035 |
| | | | 422/120 |

* cited by examiner

METAL AIR BATTERY HAVING AIR PURIFICATION MODULE, ELECTROCHEMICAL CELL HAVING AIR PURIFICATION MODULE AND METHOD OF OPERATING METAL AIR BATTERY

CROSS-REFERENCE TO RELATED APPLICATION

This application claims priority to Korean Patent Application No. 10-2015-0060723, filed on Apr. 29, 2015, and Korean Patent Application No. 10-2015-0161723, filed on Nov. 18, 2015, and all the benefits accruing therefrom under 35 U.S.C. § 119, the content of which in its entirety is herein incorporated by reference.

BACKGROUND

1. Field

The disclosure relates to a metal air battery, electrochemical cell having air purification module and a method of operating the metal air battery, and more particularly, to a metal air battery including an air purification module, electrochemical cell having air purification module and a method of operating the metal air battery.

2. Description of the Related Art

Electrochemical cell having air purification module, for example a metal air battery typically includes a plurality of metal air battery cells, each of which includes a cathode that may absorb and emit ions and an anode that uses oxygen in the air as an active material. Deoxidation and oxidation reactions of oxygen flowing from an external source occur in the anodes, and oxidation and deoxidation reactions of metal occur in the cathodes. Chemical energy generated by such deoxidation and oxidation reactions is converted into electric energy to thereby extract the electric energy. For example, the metal air battery absorbs oxygen during discharging and emits oxygen during charging. Since the metal air battery uses oxygen existing in the air, an energy density of the metal air battery may be rapidly improved. For example, the metal air battery may have an energy density several times higher than an energy density of an existing lithium ion battery.

Also, the metal air battery has a low ignition possibility due to an abnormal high temperature and thus has an outstanding stability. In addition, the metal air battery operates through an absorption and an emission of only oxygen without using heavy metals and thus reduces environmental pollution. Due to such features, studies on the metal air battery have been widely conducted.

SUMMARY

When a metal air battery operates, air is supplied to the cathodes and anodes to use oxygen molecules as an active material. Here, impurities, such as water ($H_2O$) and carbon dioxide ($CO_2$) contained in air, may interrupt metal peroxides, for example, lithium peroxide ($Li_2O_2$), from being generated such that a capacity and a lifespan of the metal air battery may be deteriorated.

Provided are embodiments of a metal air battery having an air purification module electrochemical cell having air purification module and a method of operating the metal air battery.

According to an exemplary embodiment, a metal air battery includes: a battery cell module which generates electricity using oxidation and deoxidation of metal; and an air purification module which communicates fluid to the battery cell module, purifies air flowing from an outside, and supplies the purified air to the battery cell module. In such an embodiment, the air purification module includes: a first air purifier which filters a first impurity of a plurality of impurities in the air flowing from the outside; and a second air purifier which filters a second impurity of the plurality of impurities, which is different from the first impurity.

In an exemplary embodiment, the air purification module may include: a concentration detector which detects a concentration of at least one of the plurality of impurities in the air flowing from the outside; and a controller which controls operations of the first and second air purifiers based on information detected by the concentration detector.

In an exemplary embodiment, the plurality of impurities may include at least two selected from water ($H_2O$), carbon dioxide ($CO_2$), and nitrogen ($N_2$).

In an exemplary embodiment, the second air purifier may be disposed between the first air purifier and the battery cell module, and filter the second impurity from the air passed through the first air purifier.

In an exemplary embodiment, the second air purifier may enrich oxygen ($O_2$) to increase a concentration of oxygen ($O_2$) in the air supplied to the battery cell module to be about 21% or more.

In an exemplary embodiment, the controller may control first electric power for the first air purifier based on the information detected by the concentration detector and control second electric power for the second air purifier based on the controlled first electric power for the first air purifier.

In an exemplary embodiment, when the concentration of the least one of the plurality of impurities detected by the concentration detector increases, the controller may increase the first electric power for the first air purifier and decrease the second electric power for the second air purifier.

In an exemplary embodiment, when the concentration of the least one of the plurality of impurities detected by the concentration detector decreases, the controller may decrease the first electric power for the first air purifier and increase the second electric power for the second air purifier.

In an exemplary embodiment, the air purification module may further include a third air purifier configured to filter a third impurity of the plurality of impurities, which is different from the first and second impurities.

In an exemplary embodiment, the first and second air purifiers may be disposed in a chamber and filter the first and second impurities from air flowing into the chamber.

In an exemplary embodiment, the air purification module may operate according to at least one of a pressure swing adsorption ("PSA") method, a temperature swing adsorption ("TSA") method, a pressure temperature swing adsorption ("PTSA") method, a vacuum swing adsorption ("VSA") and a selective separation method.

In an exemplary embodiment, the air purification module may include at least one selected from an absorbent material and a selective transmission layer.

In an exemplary embodiment, the absorbent material may include as least one selected from a zeolite, an alumina, a silica gel, a metal-organic framework (MOF), a zeolitic imidazolate framework (ZIF) and an activated carbon.

In an exemplary embodiment, the metal air battery may be a lithium (Li) air battery.

The metal air battery may further include: a first connection path which fluid-connects the first air purifier and the second air purifier; a second connection path which fluid-connects the second air purifier and the battery cell module; a bypass path which by passes the second air purifier and fluid-connects the first and second connection paths; and a flow controller which controls a flow of air supplied into the second air purifier.

The flow controller may control a flow of air supplied by the second air purifier to be lower than or equal to a maximum air flow having an oxygen concentration higher than or equal to 95% of a maximum oxygen concentration of air concentrated by the second air purifier.

The battery cell module may be supplied with air into which air passing through the bypass path and air passing through the second air purifier are mixed.

According to another exemplary embodiment, a method of operating the metal air battery described above includes: filtering the first impurity of the plurality of impurities in air flowing from an outside by a first air purifier; and filtering a second impurity of the plurality of impurities, which is different from the first impurity by a second first air purifier.

In an exemplary embodiment, the method may further include: detecting a concentration of at least one of the plurality of impurities in the air flowing into the air purification module from the outside; and controlling operations of the first and second air purifiers to filter the first and second impurities based on the detected concentration of the at least one of the plurality of impurities.

In an exemplary embodiment, the controlling the operations of the first and second air purifiers may include: controlling first electric power for the first air purifier based on the detected concentration of the at least one of the plurality of impurities; and controlling second electric power for the second air purifier based on the controlled first electric power for the first air purifier.

In an exemplary embodiment, when the detected concentration the at least one of the plurality of impurities increases, the first electric power for the first air purifier may increase, and the second electric power for the second air purifier may decrease.

In an exemplary embodiment, when the detected concentration the at least one of the plurality of impurities decreases, the first electric power for the first air purifier may decrease, and the second electric power for the second air purifier may increase.

In an exemplary embodiment, the filtering the first impurity and the filtering the second impurity may be performed sequentially or simultaneously.

A portion of air filtered by the first air purifier may be supplied into the second air purifier, an other portion of the air filtered by the first air purifier may be supplied onto the bypass path, and air filtered by the second air purifier and air passing through the bypass path may be mixed to be supplied into a battery cell module.

A flow of the air supplied into the second air purifier may be controlled by a flow controller.

A flow of air supplied by the second air purifier may be controlled by the flow controller to be lower than or equal to a maximum air flow having an oxygen concentration higher than or equal to 95% of a maximum oxygen concentration of air concentrated by the second air purifier.

According to another exemplary embodiment, an electrochemical cell includes: a battery cell module which generates electricity by using a chemical reaction; and an air purification module which is connected to the battery cell module, purifies air flowing from an outside, and supplies the purified air to the battery cell module. The air purification module may include: a first air purifier which filters a first impurity of a plurality of impurities in the air flowing from the outside; and a second air purifier which filters a second impurity of the plurality of impurities, which is different from the first impurity.

The electrochemical cell may further include: a first connection path which fluid-connects the first air purifier and the second air purifier; a second connection path which fluid-connects the second air purifier and the battery cell module; a bypass path which bypasses the second air purifier and fluid-connects the first and second connection paths; and a flow controller which controls a flow of air supplied into the second air purifier.

BRIEF DESCRIPTION OF THE DRAWINGS

These and/or other features of embodiments of the invention will become apparent and more readily appreciated from the following description of the exemplary embodiments, taken in conjunction with the accompanying drawings, in which.

DETAILED DESCRIPTION

Figure 1:
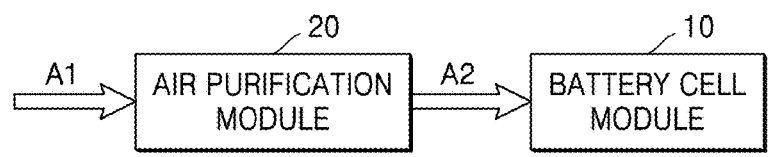
FIG. 1 is a schematic block diagram of an electrochemical cell according to an exemplary embodiment of the invention.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A metal air battery, an electrochemical cell and a method of operating the meal air battery according to an exemplary embodiment will now be described in detail with reference to FIG. 1.

Referring to FIG. 1, an exemplary embodiment of the electrochemical cell includes a battery cell module 10 and an air purification module 20. The electrochemical cell may be a metal air. In an exemplary embodiment, the metal air battery may be a lithium air battery. However, the metal air battery is not limited thereto and alternatively, the metal air battery may be a sodium air battery, a zinc air battery, a potassium air battery, a calcium air battery, a magnesium air battery, an iron air battery, an aluminum air battery or an alloy air battery including two kinds of metal mentioned above.

The battery cell module 10 generates electricity using oxidation of metal and deoxidation of oxygen (O).

In one exemplary embodiment, for example, where the metal is lithium (Li), the metal air battery generates electricity through a reaction that generates lithium peroxides ($Li_2O_2$) through a reaction between Li and O as in reaction formula 1 below.

$$Li + \tfrac{1}{2}O_2 \rightarrow \tfrac{1}{2}Li_2O_2 \qquad \text{[Reaction Formula 1]}$$

However, if impurities, e.g., water ($H_2O$), exist in air, an energy density and a lifespan of the metal air battery may be reduced due to a reaction that generates lithium hydroxide (LiOH) as in reaction formula 2 below.

$$4Li + 6H_2O + O_2 \rightarrow 4(LiOH \cdot H_2O) \qquad \text{[Reaction Formula 2]}$$

The air purification module 20 communicates fluid to the battery cell module 10.

The air purification module 20 removes impurities from air A1 flowing from the outside to purify the air A1 and supplies the purified air A2 to the battery cell module 10.

In an exemplary embodiment, the air purification module 20 purifies a plurality of impurities from the air A1 flowing into the air purification module 20.

In such an embodiment, the plurality of impurities may include at least two selected from materials in the air A2 except for $O_2$, e.g., carbon oxide ($CO_2$), and nitrogen ($N_2$). In one exemplary embodiment, for example, the air purification module 20 may filter first and second impurities.

Figure 2:
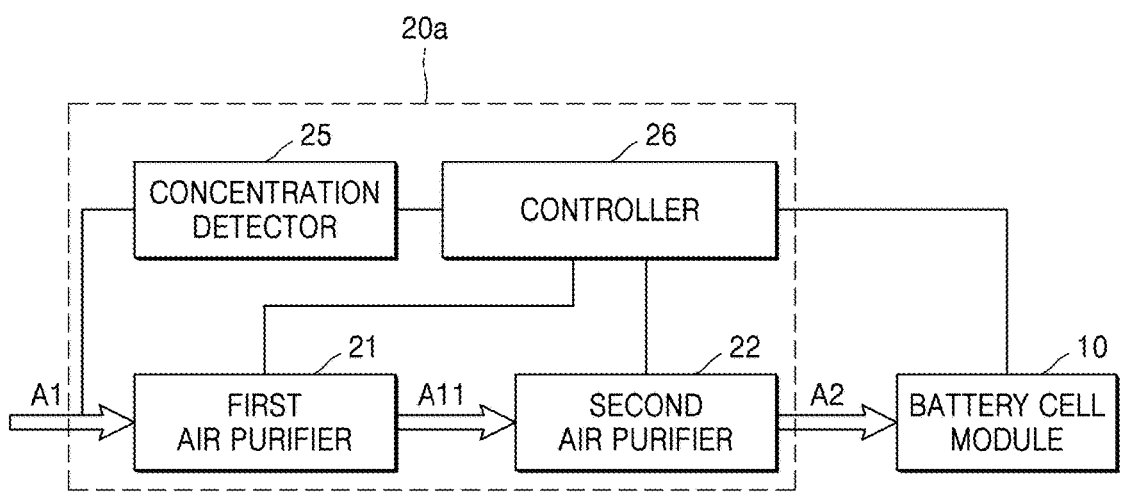
FIG. 2 is a schematic block diagram of a metal air battery having an air purification module according to an exemplary embodiment of the invention.

FIG. 2 is a schematic block diagram of a metal air battery including an air purification module 20a according to an exemplary embodiment. Referring to FIG. 2, an exemplary embodiment of the air purification module 20a may include a first air purifier 21 and a second air purifier 22.

The first air purifier 21 may filter a first impurity. The first impurity may be one selected from $H_2O$, $CO_2$, and $N_2$. In one exemplary embodiment, for example, the first air purifier 21 may remove $H_2O$. The first air purifier 21 that removes the $H_2O$ may be referred to as an air dryer.

The second air purifier 22 may filter a second impurity. The second impurity may be one selected from $H_2O$, $CO_2$, and $N_2$. The second impurity may be different from the first impurity. In one exemplary embodiment, for example, the first air purifier 21 removes $H_2O$, and the second air purifier 22 may remove $N_2$. However, the filtering of the second impurity performed by the second air purifier 22 is not limited to removing only the second impurity by the second air purifier 22. In one exemplary embodiment, for example, the second air purifier 22 may filter the first and second impurities.

In such an embodiment, the second air purifier 22 may remove $N_2$ to enrich $O_2$. The second air purifier 22 may enrich $O_2$ to enable a concentration of $O_2$ in the air to be about 21% or more, e.g., about 30% or more or about 40% or more. The second air purifier 22 that enriches $O_2$ may be referred to as an oxygen generator.

The second air purifier 22 may be disposed between the first air purifier 21 and the battery cell module 10. The second air purifier 22 may communicate fluid to the first air purifier 21 and remove the second impurity from air passing through the first air purifier 21.

The air purification module 20a may be configured to operate according to a pressure swing adsorption ("PSA") method, a temperature swing adsorption ("TSA") method, a pressure temperature swing adsorption ("PTSA") method, a vacuum swing adsorption ("VSA") method, a selective separation method, or two or more of such methods. The term "PSA" used herein refers to a technology that operates according to a principle of first adsorbing or capturing a particular gas into an absorbent material at a high partial pressure and desorbing or discharging the particular gas if the partial pressure is reduced. The term "TSA" refers to a technology that operates according to a principle of first adsorbing or capturing a particular gas into an absorbent material at a room temperature and desorbing or discharging the particular gas if the temperature increases. The term "PTSA refers to a technology into which the PSA and the TSA are combined. The term "VSA" refers to a technology that operates according to a principle of first adsorbing or capturing a particular gas into an absorbent material at around an air pressure and desorbing or discharging the particular gas in vacuum.

In an exemplary embodiment, an absorbent material (not shown) may be filled into the first and second air purifiers 21 and 22, or a selective transmission layer (not shown) may be disposed in the first and second air purifiers 21 and 22. In one exemplary embodiment, for example, the absorbent material may be filled into the first and second air purifiers 21 and 22, and the selective transmission layer may be disposed in the first and second air purifiers 21 and 22.

The absorbent material selectively adsorbs impurities in the air A1. The absorbent material may include at least one selected from a zeolite, an alumina, a silica gel, a metal-organic framework ("MOF"), a zeolitic imidazolate framework ("ZIF") and an activated carbon. The term "MOF" used herein refers to a crystalline compound including metal ions or metal cluster coordinated in an organic molecule to form a first, second, or third porous structure. Also, the term "ZIF" refers to a nano-porous compound including a tetrahedral cluster of $MN_4$ (wherein M is metal) linked by imidazolate lead.

The selective transmission layer selectively transmits other components except impurities of the air A1. The selective transmission layer may include a plurality of ion exchange hollow fibers that are disposed in parallel or parallel with a flow direction of the air A1.

In such an embodiment, as described above, when the air A1 flowing from the outside into the air purification module 20a passes through the first and second air purifiers 21 and 22, the first and second impurities in the air A1 may be removed.

If the air purification module 20a has a structure that filters only one impurity, other impurities except the one impurity may not be filtered but may be supplied to the battery cell module 10, and a side reaction caused by the other impurities may not be effectively prevented. Therefore, an energy density and a lifespan of the metal air battery may be reduced.

However, in an exemplary embodiment of the air purification module 20a, the first and second air purifiers 21 and 22 may remove a plurality of impurities in the air A1 to effectively prevent the reduction in the lifespan of the metal air battery caused by the impurities and improve energy efficiency.

Figure 3:
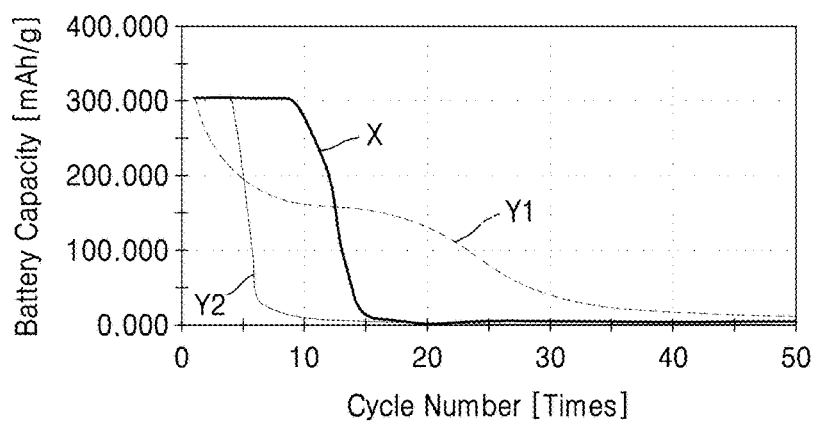
FIG. 3 is a graph illustrating changes in a battery capacity per a unit weight with an increase in the number of that times a metal air battery is discharged and charged, according to an exemplary embodiment of the invention and comparative embodiments 1 and 2.

FIG. 3 is a graph illustrating changes in a battery capacity per a unit weight with an increase in the number of times a metal air battery is charged and discharged according to an exemplary embodiment of the invention and comparative embodiments 1 and 2. The air purification module 20a of the metal air battery according to an exemplary embodiment X includes the first air purifier 21 that filters $H_2O$ and the second air purifier 22 that filters $N_2$ to enrich $O_2$. An air purification module of a metal air battery according to a first comparative embodiment Y1 includes only the first air purifier 21 that filters $H_2O$. An air purification module of a metal air battery according to a second comparative embodiment Y2 includes only the second air purifier 22 that filters $N_2$ to enrich $O_2$.

In the air purification module 20a according to an exemplary embodiment of the invention, the first air purifier 21 removes $H_2O$ from the air A2 flowing into the battery cell module 10, and thus a concentration of $H_2O$ may be about 40 parts per million (ppm). In such an embodiment of the invention, the second air purifier 22 removes $N_2$ from the air A2 and enriches $O_2$, and thus a concentration of $O_2$ may be about 70%. In such embodiment of the invention, the metal air battery keeps a battery capacity at about 300 milliampere-hours per gram (mAh/g) until the number of times the metal air battery is charged and discharged is about 9 times.

In the air purification module according to the first comparative embodiment Y1, the first air purifier 21 removes $H_2O$ from the air A2 flowing into the battery cell module 10, and thus a concentration of $H_2O$ may be about 40 ppm. However, in such a comparative embodiment, $N_2$ is not removed from the A2, and a concentration of $O_2$ is not enriched, and thus a concentration of $O_2$ may be about 21%. In such a comparative embodiment, since the number of times the metal air battery is charged and discharged is 2 times, the battery capacity per unit weight starts to be reduced.

In the air purification module according to the second comparative embodiment Y2, the air purifier 22 removes $N_2$ from the air A2 flowing into the battery cell module 10 and enriches $O_2$, and thus a concentration of $O_2$ may be about 70%. However, in such a comparative embodiment $H_2O$ is not removed from the air A2, and thus a concentration of $H_2O$ may be about 68000 ppm (a relative humidity is 50 at 60° C.). In such a comparative embodiment, since the number of times the metal air battery is charged and discharged is about 4 times, the battery capacity per unit weight is rapidly reduced.

As described above, the number of times the air purification module 20a according to an exemplary embodiment X is charged and discharged is about 2 times longer than the number of times the air purification modules according to the first and second comparative embodiments Y1 and Y2 is charged and discharged. Therefore, in an exemplary embodiment, where a plurality of air purifiers filters a plurality of impurities, a lifespan of the metal air battery substantially increases.

In exemplary embodiments of the invention described above, a plurality of air purifiers may include two air purifiers, e.g., the first and second air purifiers 21 and 22, but not being limited thereto. In an alternative exemplary embodiment, the plurality of air purifier may include three or more air purifiers.

Figure 4:
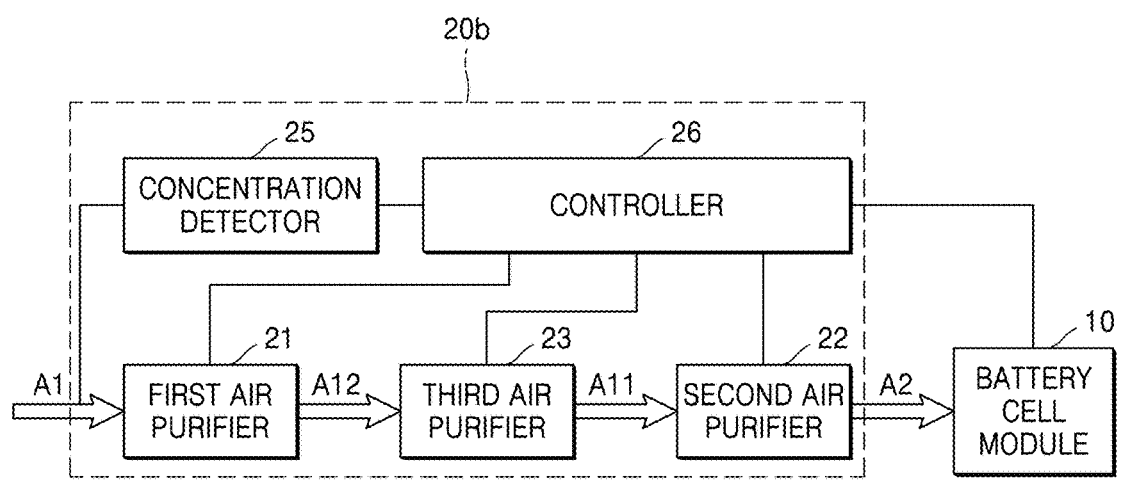
FIG. 4 is a schematic block diagram of a metal air battery having an air purification module according to another exemplary embodiment of the invention.

In one exemplary embodiment, for example, as shown in FIG. 4, an air purification module 20b may further include a third air purifier 23 that filters a third impurity different from first and second impurities. In an exemplary embodiment, where the first and second impurities are $H_2O$ and $N_2$, the third impurity may be $CO_2$.

A plurality of air purifiers consumes preset electric power to remove a plurality of impurities. In one exemplary embodiment, for example, the first air purifier 21 consumes first electric power E1 to remove the first impurity, and the second air purifier 22 consumes second electric power E2 to remove the second impurity.

Referring back to FIG. 2, an exemplary embodiment of the air purification module 20a may further include a concentration detector 25 that detects a concentration of an impurity in air flowing into the air purification module 20a and a controller 26 that controls the first and second air purifiers 21 and 22 based on information detected by the concentration detector 25. Therefore, the air purification module 20a includes the first and second air purifiers 21 and 22 and may reduce an increase in electric powers for the first and second air purifiers 21 and 22, that is, electric powers consumed by the first and second air purifiers 21 and 22.

In an exemplary embodiment, the concentration detector 25 may detect a concentration of a first impurity in air A1 flowing into the air purification module 20a. In one exemplary embodiment, for example, the concentration detector 25 may detect a concentration of $H_2O$ in the air A1 flowing from an external source.

In an exemplary embodiment, the controller 26 may control an operation of the first air purifier 21 based on information associated with the concentration of the first impurity detected by the concentration detector 25. In one exemplary embodiment, for example, the controller 26 may control the operation of the first air purifier 21 based on changes in the concentration of the first impurity detected by the concentration detector 25.

In such an embodiment, when the concentration of the first impurity increases, the controller 26 may increase the first electric power E1 consumed by the first air purifier 21. In such an embodiment, when the concentration of the first impurity decreases, the controller 26 may decrease the first electric power E1 consumed by the first air purifier 21. In such an embodiment, when the concentration of the first impurity does not change, the controller 25 may maintain the first electric power E1 consumed by the first air purifier 21. Here, the increase, the decrease or the maintenance in the concentration of the first impurity may mean that the concentration detected by the concentration detector 25 increase, decrease, or is equal to about a concentration (or a preset reference concentration) detected immediately before the concentration is detected.

In an exemplary embodiment, a flow rate and an operation time of the first air purifier 21 may increase or decrease based on an increase or a decrease in the first electric power E1.

The controller 26 may adjust second electric power E2 consumed by the second air purifier 22 based on the adjusted first electric power E1 of the first air purifier 21. Therefore, a concentration of $O_2$ in the air A2 supplied to the battery cell module 10 may change based on changes in the second electric power E2.

In one exemplary embodiment, for example, the controller 26 may control the second electric power E2 consumed by the second air purifier 22 to enable an increase $\Delta P_{OUT}$ in an output power of the metal air battery to be highest.

As in interaction formula 1 below, the increase $\Delta P_{OUT}$ in the output power of the metal air battery may be a value that is acquired by subtracting a change ($\Delta E_{H2O}+\Delta E_{O2}$) of electric power consumed by operations of the first and second air purifiers 21 and 22 from a change (($B1*\Delta V_{H2O}+B1*\Delta V_{O2}$)*A) of an output power of the battery cell module 10 caused by the operations of the first and second air purifiers 21 and 22. The change of the output power of the battery cell module 10 may be acquired by multiplying a voltage change ($B1*\Delta V_{H2O}+B1*\Delta V_{O2}$) of the battery cell module 10 by a preset current value A. Here, B1 and B2 denote weight values applied to the first and second air purifiers 21 and 22, respectively, and satisfy the following equation: B1+B2=1.

$$\Delta P_{out} = (B1*\Delta V_{H2O}+B2*\Delta V_{O2})*A-(\Delta E_{H2O}+\Delta E_{H2}) \quad \text{[Interaction Formula 1]}$$

The controller 26 may determine the second electric power E2 consumed by the second air purifier 22 at a point where the change $\Delta P_{OUT}$ of the output power of the metal air battery is highest and a concentration of $O_2$ according to the second electric power E2, considering an increased voltage value of the battery cell module 10 according to a decrease in a concentration of a first impurity, an increase in a concentration of $O_2$ and electric power consumed to decrease the concentration of the first impurity and to increase the concentration of $O_2$.

Figure 5A:
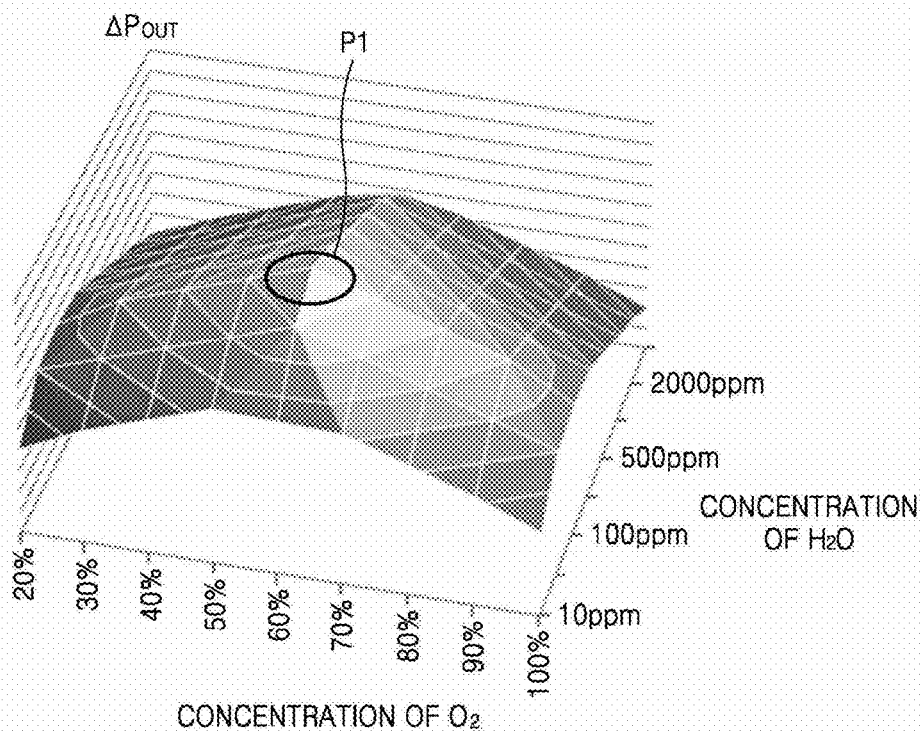
FIGS. 5A and 5B illustrate output powers of a metal air battery appearing with adjustments of a concentration of water and a concentration of oxygen in the air supplied to a battery cell module when airs having different water concentrations flow into an air purification module.
Figure 5B:
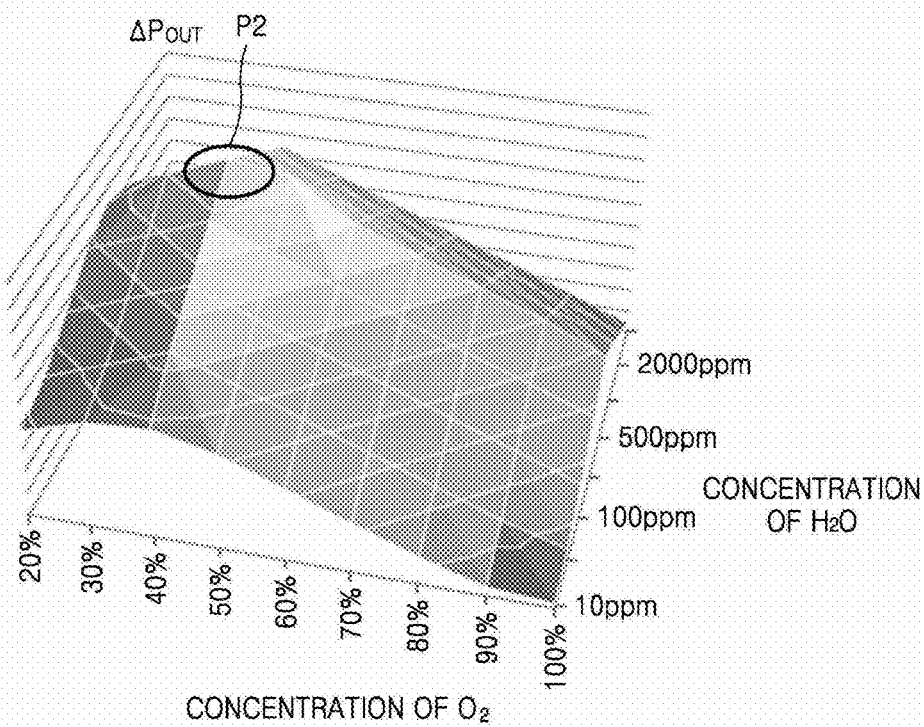

FIG. 5A illustrates an output power of a metal air battery according to an adjustment of a concentration of $H_2O$ and a concentration of $O_2$ in the air supplied to the battery cell module 10 when a concentration of $H_2O$ included in air flowing from an outside is a first concentration. FIG. 5B illustrates an output power of a metal air battery according to an adjustment of a concentration of $H_2O$ and a concentration of $O_2$ in the air supplied to the battery cell module 10 when a concentration of $H_2O$ included in air flowing from an outside is a second concentration different from the first concentration. Here, first and second concentrations are different concentrations of $H_2O$.

Referring to FIG. 5A, when a concentration of $H_2O$ in air A1 flowing from an outside is the first concentration, an increase $\Delta P_{OUT}$ in the output power of the metal air battery is highest at point P1. In one exemplary embodiment, for example, when the concentration of $H_2O$ in the air A1 flowing from the outside is the first concentration, the first air purifier 21 purifies the air A1 to enable the concentration of $H_2O$ to be about 100 ppm, and the second air purifier 22 purifies the air A1 to enable the concentration of $O_2$ to be about 60%, the increase $\Delta P_{OUT}$ of the output power of the metal air battery may be highest.

The controller 26 determines the second electric power E2 consumed by the second air purifier 22 to enable the output power of the metal air battery to be highest and the concentration of $O_2$ to be about 60% by the second air purifier 22.

The concentration of $H_2O$ in the air A1 flowing from the outside may change according to changes in an external environment. In such an embodiment, the concentration of $H_2O$ in the air A1 flowing from the outside may change from a first concentration to a second concentration. Therefore, as shown in FIG. 5B, when the concentration of $H_2O$ in the air A1 flowing from the outside changes, the increase $\Delta P_{OUT}$ in the output power of the metal air battery may be highest at point P2. In such an embodiment, when the concentration of $H_2O$ in the air A1 flowing from the outside is the second concentration, the first air purifier 21 purifies the air A1 to enable the concentration of $H_2O$ to be about 500 ppm, and the second air purifier 22 purifies the air A1 to enable the concentration of $O_2$ to be about 21%, the increase $\Delta P_{OUT}$ in the output power of the metal air battery may be highest. As described above, a point where the increase $\Delta P_{OUT}$ in the output power of the metal air battery is highest according to the changes in the external environment may change from P1 to P2.

According to the changes in the external environment, the controller 26 determines the second electric power E2 consumed by the second air purifier 22 to enable the increase $\Delta P_{OUT}$ in the output power of the metal air battery to be highest and the concentration of $O_2$ to be about 21% by the second air purifier 22.

An exemplary embodiment of a method of operating the metal air battery will now be described in detail with reference to FIG. 1 and FIGS. 6A through 6C.

In an exemplary embodiment, the metal air battery detects a concentration of an impurity in the air A1 flowing into the air purification module 20 through the concentration detector 25. In one exemplary embodiment, for example, the concentration detector 25 detects a concentration of $H_2O$ in air flowing into the air purification module 20. A concentration of H2O in the air A1 flowing into the air purification module 20 may change according to various external environmental changes such as a temperature, a humidity, etc. The changes in the concentration of $H_2O$ in the air A1 may be calculated or measured based on the concentration detected by the concentration detector 25.

The controller 26 may control operations of the first and second air purifiers 21 and 22 based on the detected concentration of $H_2O$ in the air A1 flowing into the air purification module 20 to improve energy efficiency.

The controller 26 may maintain, increase, or decrease the first electric power E1 consumed by the first air purifier 21 based on the changes in the detected concentration of $H_2O$ in the air A1 flowing into the air purification module 20.

In one exemplary embodiment, for example, when the detected concentration of $H_2O$ increases more than a previously detected concentration of $H_2O$, the controller 26 may increase the first electric power E1 consumed by the first air purifier 21 by $\Delta E1$ to filter increased $H_2O$. When the detected concentration of $H_2O$ decreases more than the previously detected concentration of $H_2O$, the controller 26 may decrease the first electric power E1 consumed by the first air purifier 21 by $\Delta E1$ of decreased $H_2O$. When the detected concentration of $H_2O$ is equal to about the previously detected concentration of $H_2O$, the controller 26 may maintain the first electric power E1 consumed by the first air purifier 21.

The controller 26 may adjust the second electric power E2 consumed by the second air purifier 22 by $\Delta E2$ based on the change $\Delta E1$ of the first electric power E1 consumed by the first air purifier 21.

Figure 6A:
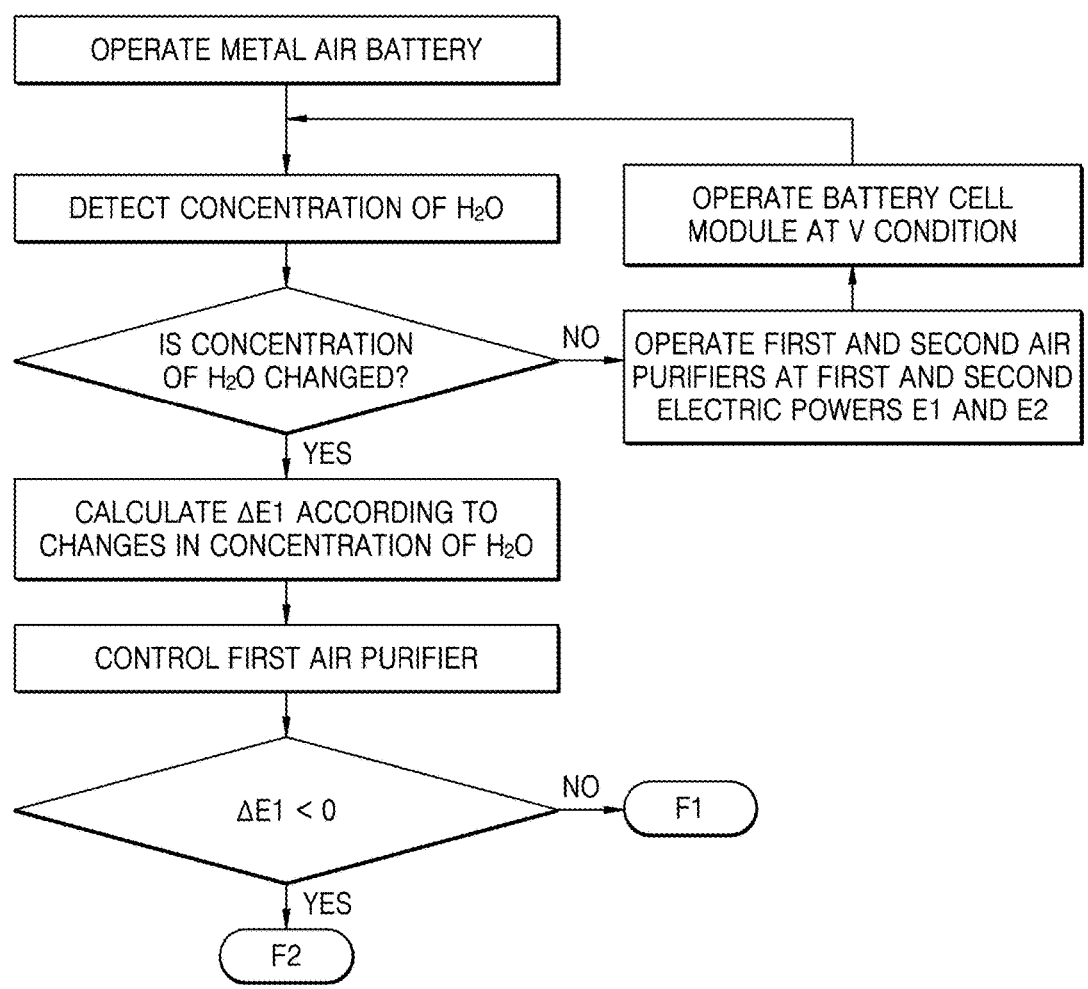
FIGS. 6A through 6C are flowcharts of exemplary embodiments of a method of operating the metal air battery of FIG. 2.
Figure 6B:
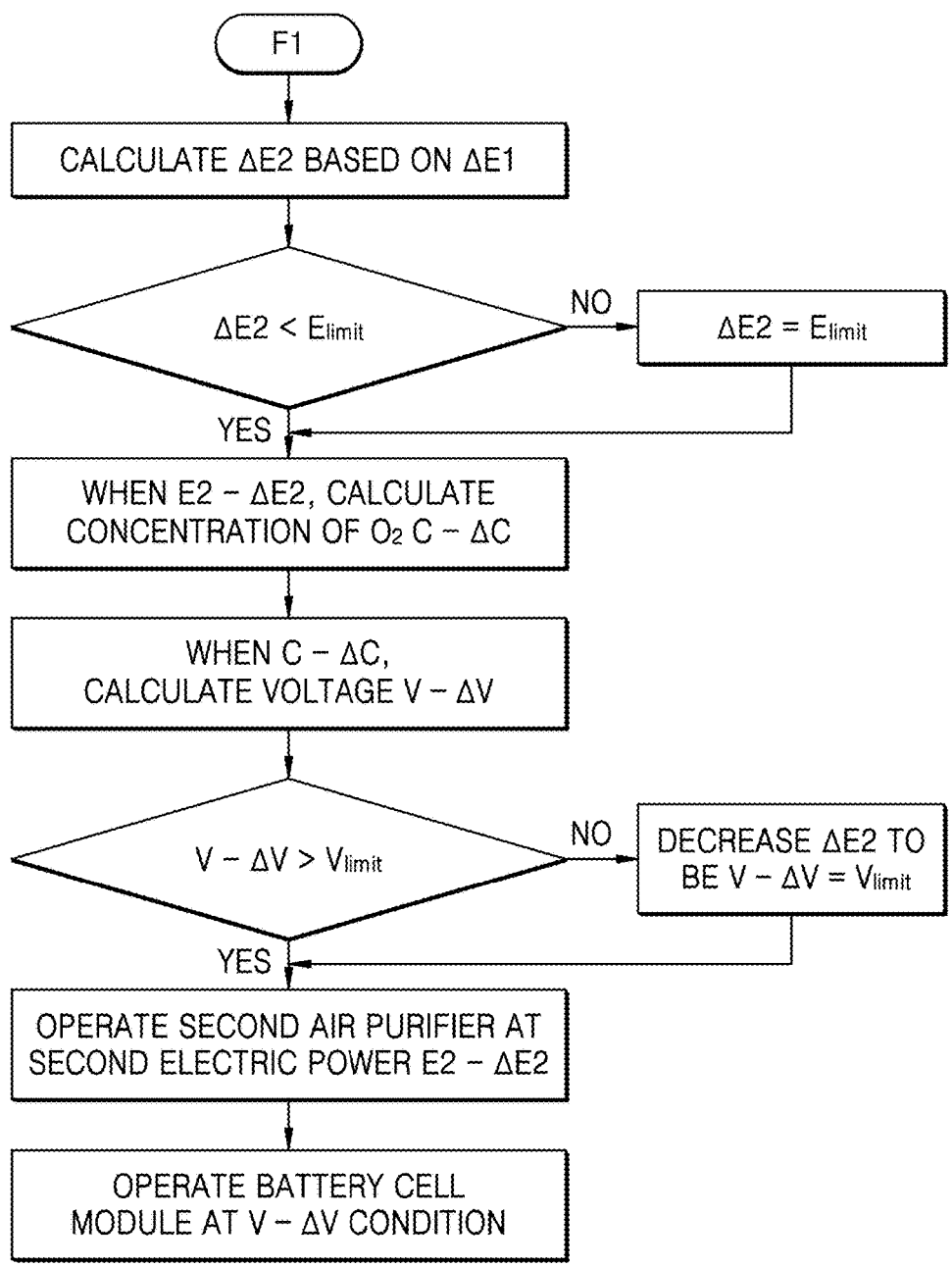

Referring to FIG. 6B, when the first electric power E1 consumed by the first air purifier 21 increases by $\Delta E1$, the controller 26 may decrease the second electric power E2 consumed by the second air purifier 22 by the change $\Delta E1$ of the first electric power E1. The change $\Delta E2$ of the second electric power E2 may be equal to about the change $\Delta E1$ of the first electric power E1. However, the change $\Delta E2$ of the second electric power E2 is not limited thereto, and thus may be substantially proportional to the change $\Delta E1$ of the first electric power E1.

The controller 26 may limit the change $\Delta E2$ of the second electric power E2 consumed by the second air purifier 22 to enable a concentration of $O_2$ in air A2 purified by the second air purifier 22 to be higher than or equal to a preset reference value. In one exemplary embodiment, for example, if the increase $\Delta E1$ in the first electric power E1 is equal to or larger than a preset limit electric power $E_{limit}$, the controller 26 may limit the change $\Delta E2$ of the second electric power consumed by the second air purifier 22 to the limit electric power $E_{limit}$.

In such an embodiment, the controller 26 may limit the change $\Delta E2$ of the second electric power E2 consumed by the second air purifier 22 to enable an output power of the battery cell module 10 to be higher than or equal to a preset reference value. When the second electric power E2 decreases by $\Delta E2$, a concentration of $O_2$ in air purified by the second air purifier 22 decreases by $\Delta C$, and thus a voltage V of the battery cell module 10 decreases by $\Delta V$. If the voltage V of the battery cell module 10 decreases to V–$\Delta V$, the output power of the battery cell module 10 may decrease. Therefore, if the voltage V–$\Delta V$ of the battery cell module 10 is equal to or lower than a preset limit voltage $V_{limit}$, the controller 26 may decrease the change $\Delta E2$ of the second electric power E2 to enable the voltage V–$\Delta V$ of the battery cell module 10 to be the preset limit voltage $V_{limit}$.

If the voltage of the battery cell module 10 is higher than the preset limit voltage $V_{limit}$, the controller 26 operates the second air purifier 22 at changed second electric power E2–$\Delta E2$. The controller 26 also operates the battery cell module 10 at a changed voltage V–$\Delta V$.

Figure 6C:
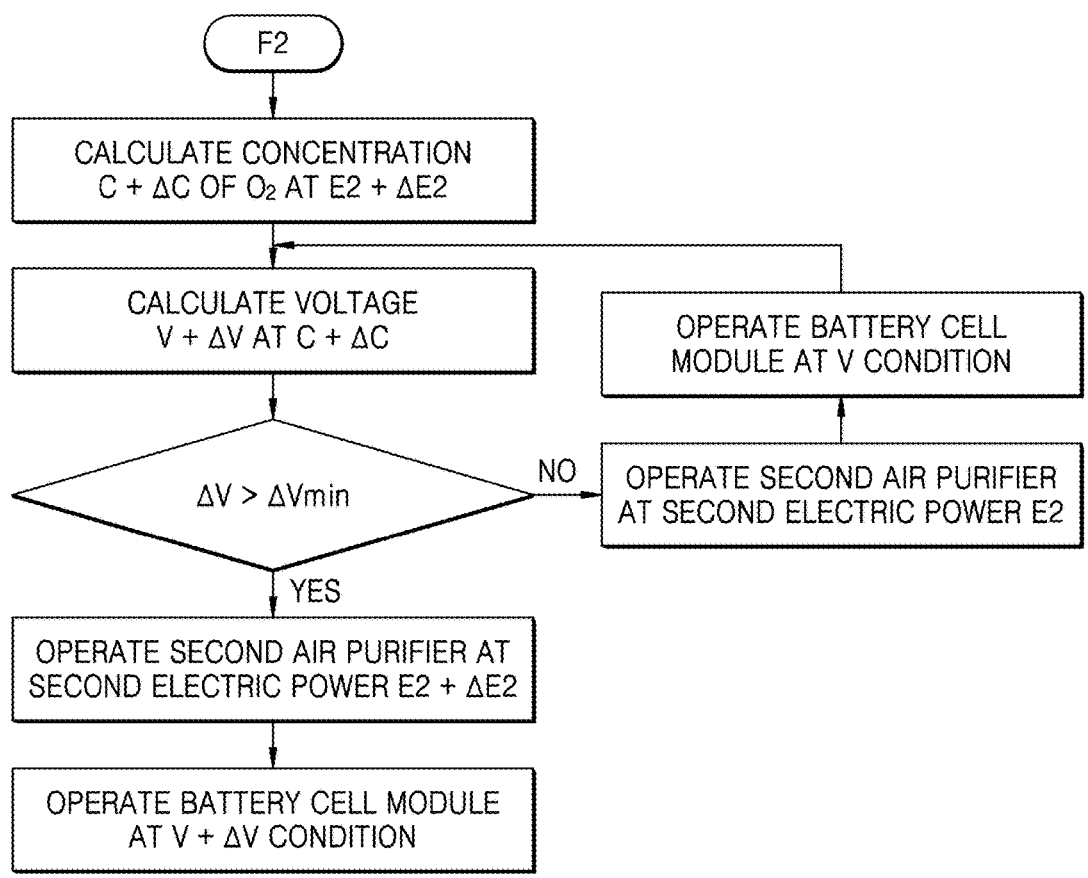

Referring to FIG. 6C, when the first electric power E1 consumed by the first air purifier 21 decreases by $\Delta E1$, the controller 26 may increase the second electric power E2 of the second air purifier 22 by the change $\Delta E1$ of the first electric power E1. The change $\Delta E2$ of the second electric power E2 may be equal to about the change $\Delta E1$ of the first electric power E1. However, the change $\Delta E2$ of the second electric power E2 is not limited thereto and thus may be substantially proportional to the change $\Delta E1$ of the first electric power E1.

Filtering of the second impurity and the concentration of $O_2$ increase due to the increased second electric power E2+$\Delta E2$. An increase C+$\Delta C$ in the concentration of $O_2$ caused by the increase E2+$\Delta E2$ in the second electric power E2 and a voltage increase V+$\Delta V$ in the battery cell module 10 caused by the increase C+$\Delta C$ in the concentration of $O_2$ may be calculated (or measured).

If the voltage increase $\Delta V$ in the battery cell module 10 is higher than a preset reference voltage $\Delta V_{min}$, the controller 26 operates the second air purifier 22 at the increased second electric power E2+$\Delta E2$. The controller 26 also operates the battery cell module 10 at the changed voltage V+$\Delta V$.

However, if the voltage increase $\Delta V$ in the battery cell module 10 is equal to or lower than the preset reference voltage $\Delta V_{min}$, the controller 26 operates the second air purifier 22 at the second electric power E2 maintained without increasing the second electric power E2 of the second air purifier 22. The controller 26 operates the battery cell module 10 at the maintained voltage V without increase a voltage.

Referring back to FIG. 6A, when the detected concentration of H2O is equal to about the previously detected concentration of $H_2O$, the controller 26 operates the first air purifier 21 without changing the first electric power E1.

Therefore, the controller 26 operates the second air purifier 22 without changing the second electric power E2. Also, the controller 26 operates the battery cell module 10 at the maintained voltage V without changing the voltage.

A process of detecting a concentration of H2O and controlling operations of the first and second air purifiers 21 and 22 as described above may be repeatedly performed at preset intervals.

Figure 7:
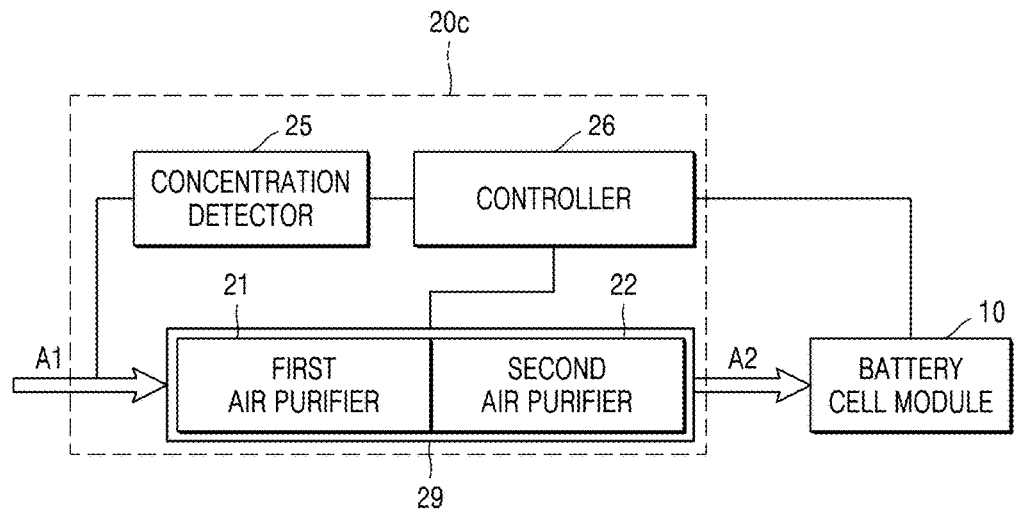
FIG. 7 is a schematic block diagram of a metal air battery having an air purification module according to another exemplary embodiment of the invention.

In such an embodiment of the air purification module 20, an operation of filtering a first impurity and an operation of filtering a second impurity are sequentially controlled by the controller 26. However, the operations of filtering the first and second impurities in an air purification module 20 are not limited to the above-described exemplary embodiment and thus may be simultaneously performed. In one exemplary embodiment, for example, first and second air purifiers 21 and 22 of an air purification module 20c may be disposed in a same chamber 29 as shown in FIG. 7. In such an embodiment, the first and second air purifies 21 and 22 may be respectively absorbent media. Therefore, the first and second air purifiers 21 and 22 may remove the first and second impurities from air flowing into the chamber 29. In such an embodiment, the controller 26 simultaneously controls an operation of the first and second air purifiers 21 and 22.

Figure 8:
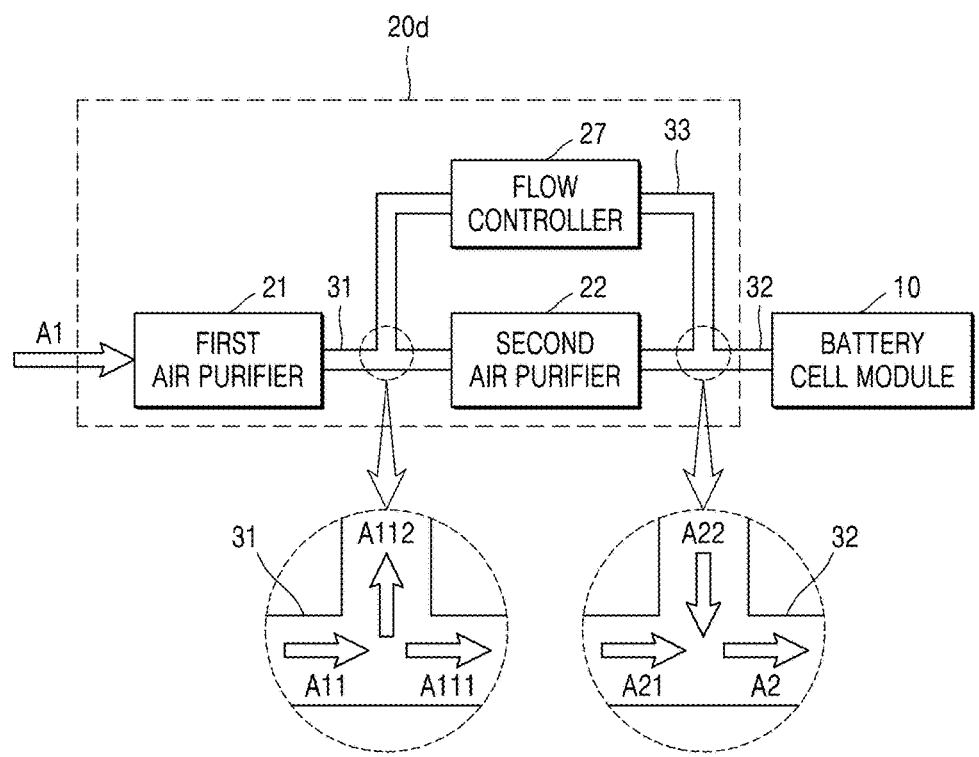
FIG. 8 schematically illustrates a metal air battery according to another exemplary embodiment of the invention.

FIG. 8 schematically illustrates a metal air battery according to another exemplary embodiment of the invention;

Referring to FIG. 8, the metal air battery includes an air purification module 20d and a battery cell module 10. The air purification module 20d includes a first air purifier 21, a second air purifier 22, a first connection path 31 that fluid-connects the first air purifier 21 and the second air purifier 22, a second connection path 32 that fluid-connects the second air purifier 22 and the battery cell module 10, a bypass path 33 that bypasses the second air purifier 22, and a flow controller 27 that controls a flow of air supplied into the second air purifier 22.

The first air purifier 21 may filter first impurity. For example, the first air purifier 21 may remove water.

The second air purifier 22 may remove second impurity different from the first impurity, e.g., nitrogen. The second air purifier 22 may remove the nitrogen to concentrate oxygen. For example, the second air purifier 22 may concentrate oxygen so as to enable an oxygen concentration of air passing through the second air purifier 22 to be higher than or equal to 21%, e.g., higher than or equal to 30%, i.e., higher than or equal to 40%.

However, an oxygen concentration characteristic of the second air purifier 22 may vary according to a flow of air A111 flowing into the second air purifier 22. This is because an amount of nitrogen that may be adsorbed or removed by the second air purifier 22 is limited. In other words, an absorption amount of nitrogen that may be adsorbed by the second air purifier 22 may be determined or fixed. Therefore, if nitrogen deviates from an adsorption capacity of the second purifier 22, the nitrogen that deviates from the adsorption capacity may not be adsorbed by the second air purifier 22, and the oxygen concentration characteristic of the second air purifier 22 may be lowered.

Figure 9:
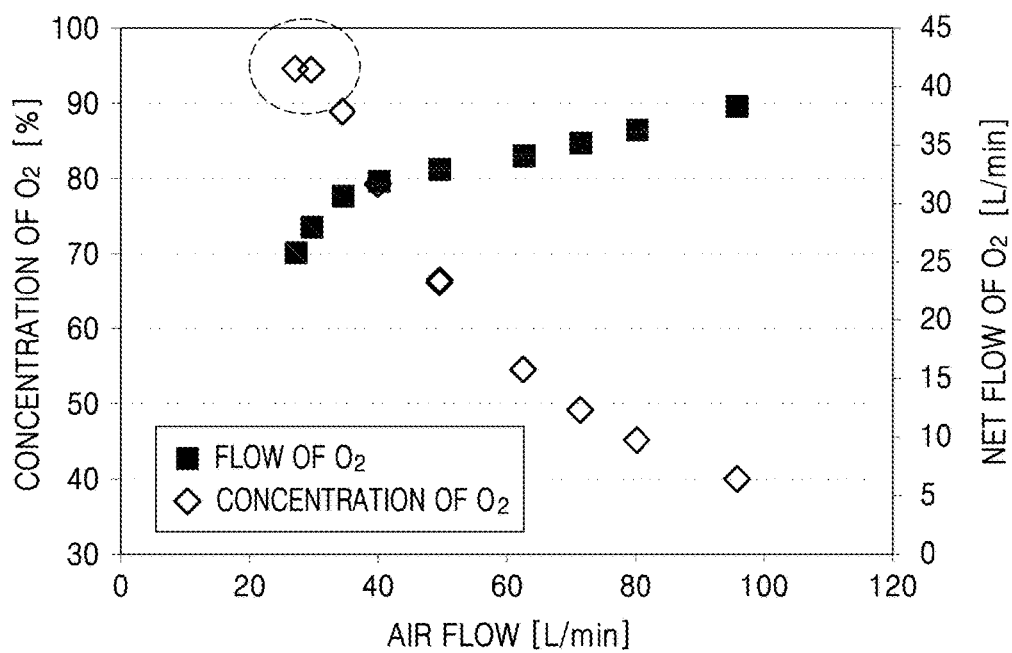
FIG. 9 illustrates an oxygen flow and an oxygen concentration according to air flowing into a second air purifier.

FIG. 9 illustrates an oxygen flow and an oxygen concentration according to air flowing into the second air purifier 22. In FIG. 9, a maximum oxygen concentration that may be concentrated by the second air purifier 22 is 94%.

Referring to FIG. 9, when a flow of air supplied into the second air purifier 22 is 30 L/min, an oxygen concentration of air passing through the second air purifier 22 is 94%. If a flow of the air supplied into the second air purifier 22 exceeds 30 L/min, an oxygen concentration of air purified by the second air purifier 22 is lowered.

In a section where a flow of air supplied into the second air purifier 22 is lower than or equal to 35 L/min, i.e., is between 30 L/min and 35 L/min, an oxygen concentration of air purified by the second air purifier 22 is gently lowered. When an air flow is 35 L, an oxygen concentration in air passing through the second air purifier 22 may be 89%.

However, if the flow of the air supplied into the second air purifier 22 exceeds 35 L/min, the oxygen concentration of the air purified by the second air purifier 22 is sharply lowered, and an increasing speed of an oxygen flow is remarkably lowered.

Referring to FIG. 8 again, in consideration of this point, the flow controller 27 may control a flow of the air A111 supplied into the second air purifier 22.

The flow controller 27 may be disposed on the bypass path 33. The bypass path 33 may fluid-connect the first connection path 31 and the second connection path 32. The flow controller 27 may be disposed on the bypass path 33 and control a flow of air A112 supplied onto the bypass path 33. Since the air A111 passing through the first air purifier 21 is divided to be supplied into the second air purifier 22 and the bypass path 33, the flow of the air A112 supplied onto the bypass path 33 may be controlled to control the flow of the air A111 supplied into the first air purifier 21. However, the disposition of the flow controller 27 is exemplarily and thus is not limited. Therefore, the flow controller 27 may be disposed on the first connection path 31.

The flow controller 27 may control the flow of the air A111 supplied into the second air purifier 22 so as to enable air A21 passing through the second air purifier 22 to be lower than or equal to a maximum air flow that may have an oxygen concentration higher than or equal to 95% of a maximum oxygen concentration that may be concentrated by the second air purifier 22.

For example, when the maximum oxygen concentration of air that may be concentrated by the second air purifier 22 is 94%, a maximum air flow, which may have an oxygen concentration higher than or equal to 89% that is 95% of the maximum oxygen concentration, may be 35 L/min. In this case, the flow controller 27 may control the flow of the air A111 supplied into the second air purifier 22 to be lower than or equal to 35 L/min.

As described above, the air purification module 20d according to an exemplary embodiment may control the flow of the air A111 supplied into the second air purifier 22 to be lower than or equal to a preset reference flow by using the flow controller 27. Therefore, although a flow of air A1 supplied into the first air purifier 21 increases, the air purification module 20d may use the flow controller 27 so as to enable the flow of the air A111 supplied into the second air purifier 22 to be lower than or equal to a preset reference flow.

Therefore, an air purification module according to an exemplary embodiment may perform an oxygen concentration at an optimal point where oxygen concentration efficiency is the highest. The second air purifier 22 may concentrate oxygen so as to enable an oxygen concentration of air passing through the second air purifier 22 to be higher than or equal to a preset concentration, e.g., 85%.

In comparison with a range where an oxygen concentration exceeds an adsorption capacity of the second air purifier 22, when the oxygen concentration is within the adsorption capacity of the second air purifier 22, a change in the oxygen concentration is slight, and thus the oxygen concentration may be stably controlled.

Figure 10:
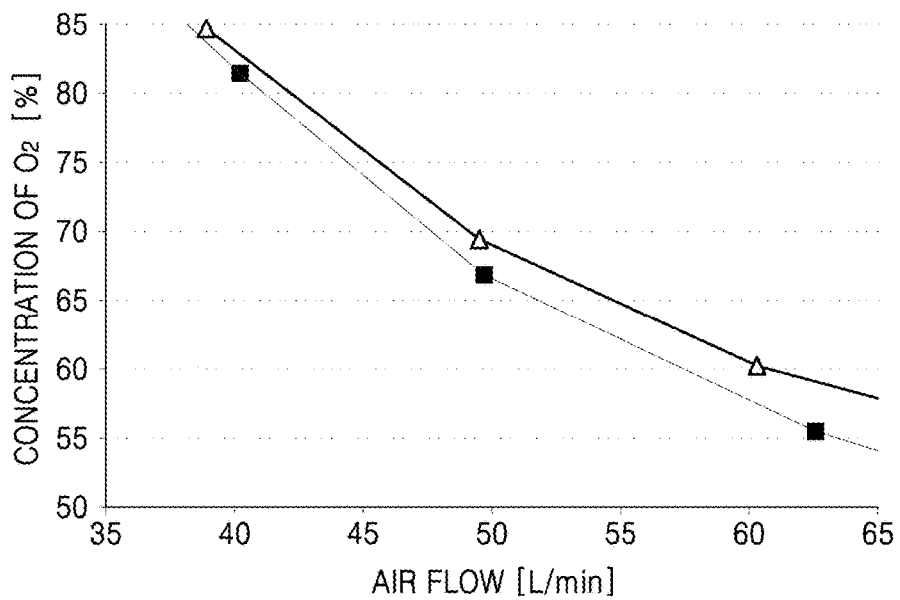
FIG. 10 is a graph illustrating an oxygen concentration with respect to air of an air purification module according to exemplary embodiments of the invention.
Figure 11:
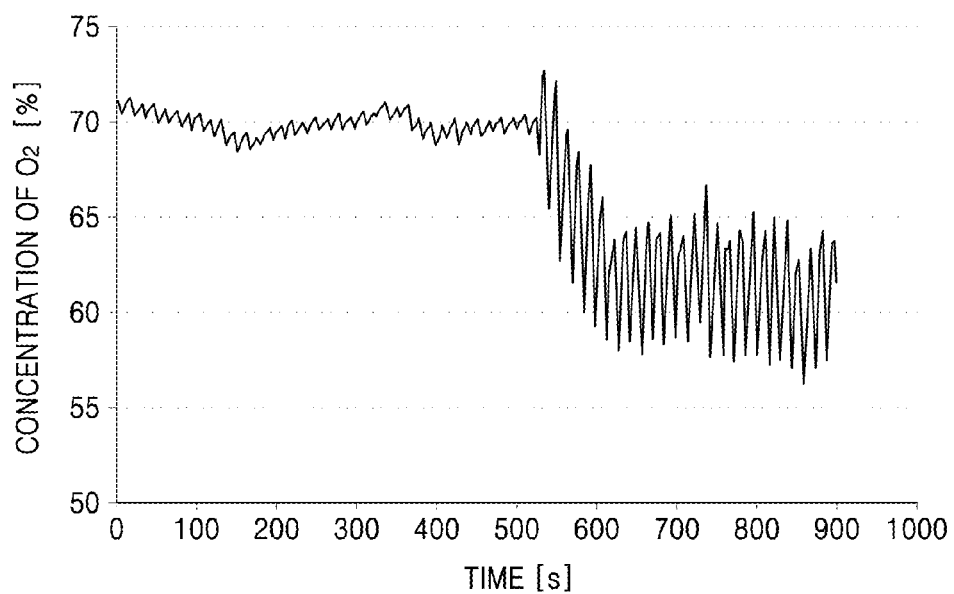
FIG. 11 illustrates changes in an oxygen concentration according to time in an air purification module, according to exemplary embodiments of the invention.
Figure 12A:
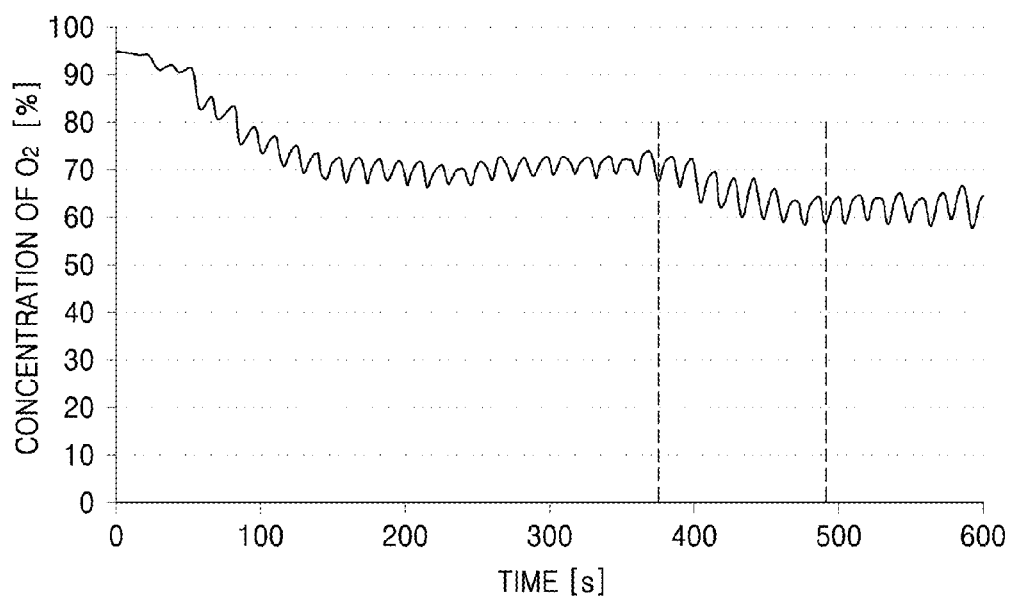
FIGS. 12A and 12B are graphs illustrating a response speed of an air purification module, according to exemplary embodiments of the invention.
Figure 12B:
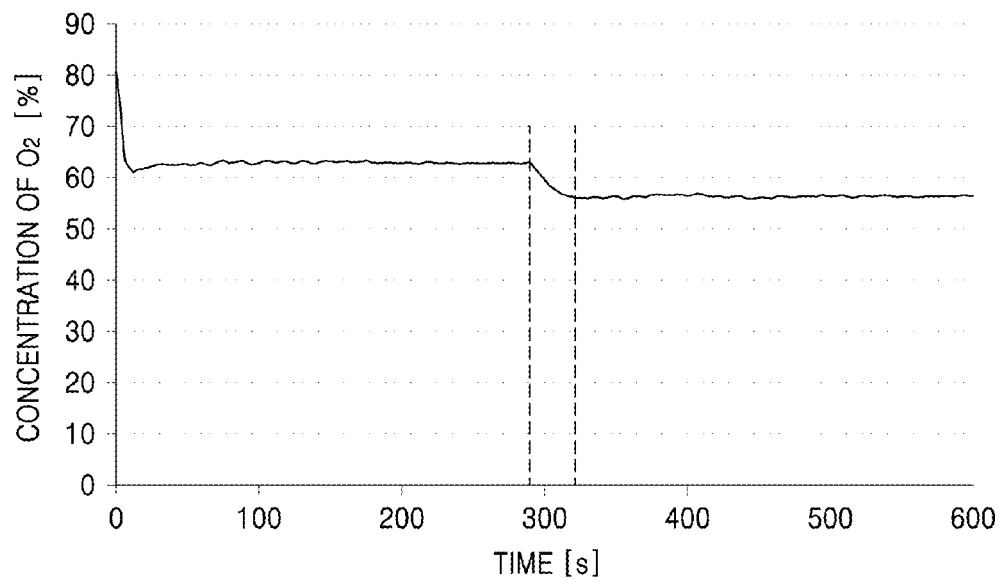

FIG. 10 is a graph illustrating an oxygen concentration with respect to an air flow of the air purification module 20d, according to first and second exemplary embodiments of the invention. FIG. 11 illustrates changes in an oxygen concentration with respect to time in the air purification module 20d, according to the first and second exemplary embodiments of the invention. FIGS. 12A and 12B are graphs illustrating a response speed of the air purification module 20d, according to the first and second exemplary embodiments of the invention.

Referring to FIGS. 10 through 12B, the air purification module 20d according to the first and second exemplary embodiments includes first and second air purifiers 21 and 22 having the same characteristics. However, the air purification module 20d according to the second exemplary embodiment includes the bypass path 33 and the flow controller 27, and the air purification module 20d according to the first exemplary embodiment does not include the bypass path 33 and the flow controller 27. When an oxygen concentration of air passing through the first air purifier 21 is 21%, and a flow of air supplied into the second air purifier 22 is 30 L/min, a maximum oxygen concentration is 94%.

Referring to FIG. 10, in the air purification module 20d according to the first exemplary embodiment, if the same air flow 60 L/min as an air flow passing through the first air purifier 21 is supplied into the second air purifier 22, an oxygen concentration of air A2 supplied into the battery cell module 10 is shown as 56.5%.

Differently in the first exemplary embodiment, in the air purification module 20d according to the second exemplary embodiment, a portion 35 L/min of air passing through the first air purifier 21 is supplied into the second air purifier 22 by the flow controller 27, and the other portion 25 L/min of the air passing through the first purifier 21 is supplied onto the bypass path 33. Air A21 passing through the second air purifier 22 and air A22 passing through the bypass path 33 are mixed to be supplied into the battery cell module 10. In this case, an oxygen concentration of the air A21 passing through the second air purifier 22 is about 89%, and an oxygen concentration of the air A22 passing through the bypass path 33 is about 21% equal to the oxygen concentration of the air A11 passing through the first air purifier 21. Therefore, an oxygen concentration of mixed air A2 supplied into the battery cell module 10 is shown as 60%.

As described above, in the air purification module 20d according to the second exemplary embodiment, a flow of air supplied into the second air purifier 22 may be controlled to check that an increase in an oxygen concentration corresponding to about 6.2% appears, in comparison with the air purification module 20d according to the first exemplary embodiment.

Referring to FIG. 11, a change in an oxygen concentration with respect to time is slighter in the air purification module 20d according to the second exemplary embodiment than in the air purification module 20d according to the first exemplary embodiment, As described above, the change in the oxygen concentration with respect to the time varies because a saturated speed of an adsorption performance of the second air purifier 22 varies according to a flow of the air A111 supplied into the second air purifier 22.

For example, if a flow of air supplied into the second air purifier 22 according to the first exemplary embodiment is 60 L/min, an adsorption performance of the second air purifier 22 may be saturated within 5 seconds. If a flow of air supplied into the second air purifier 22 according to the second exemplary embodiment is 30 L/min, the adsorption performance of the second air purifier 22 may be saturated at 10 seconds.

As described above, since the flow of the air A111 supplied into the second air purifier 22 is slighter in the air purification module 20d according to the second exemplary embodiment than in the air purification module 20d according to the first exemplary embodiment, the adsorption performance of the second air purifier 22 may be saturated late. Therefore, a change in the oxygen concentration with respect to a change in time may be slighter in the air purification module 20d according to the second exemplary embodiment than in the air purification module 20d according to the first exemplary embodiment.

Referring to FIG. 12A, in the air purification module 20d according to the first exemplary embodiment, about 110 seconds are taken to control a concentration of oxygen passing through the air purification module 20d from about 70% to about 62%. Referring to FIG. 12B, in the air purification module 20d according to the second exemplary embodiment, about 22 seconds are taken to control a concentration of oxygen passing through the air purification module 20d from about 63% to about 56%. Although oxygen concentration ranges are slightly different, a time taken to control an oxygen concentration may be remarkably reduced according to the second exemplary embodiment.

A structure of an exemplary embodiment of a battery cell module 10 included in a metal air battery will now be described with reference to FIG. 13.

Figure 13:
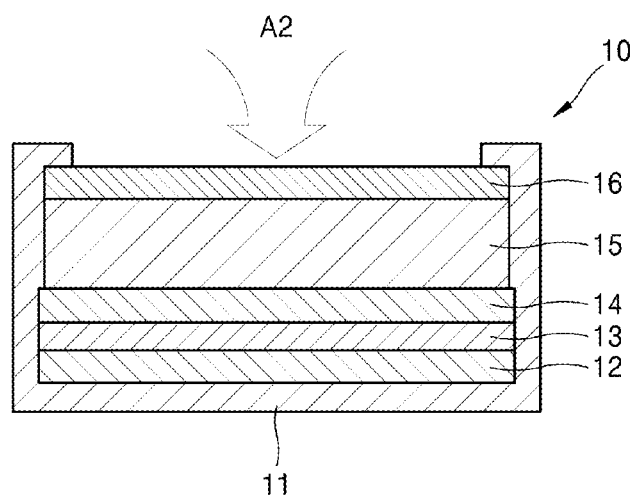
FIG. 13 is a schematic cross-sectional view of an exemplary embodiment of a battery cell module of a metal air battery.

Referring to FIG. 13, an exemplary embodiment of the battery cell module 10 includes a housing 11, a cathode metal layer 12, a cathode electrolyte layer 13 disposed on the cathode metal layer 12, an oxygen blocking layer 14 disposed on the cathode electrolyte layer 13, an anode layer 15 disposed on the oxygen blocking layer 14, and a gas diffusion layer 16 disposed on the anode layer 15.

The housing 11 houses and seals the cathode metal layer 12, the cathode electrolyte layer 13, the oxygen blocking layer 14, the anode layer 15, and the gas diffusion layer 16.

The cathode metal layer 12 adsorbs and emits metal ions. The cathode metal layer 12 may include Li, sodium (Na), zinc (Zn), potassium (K), calcium (Ca), magnesium (Mg), iron (Fe), aluminum (Al), or a combination thereof, e.g., an alloy thereof.

In an exemplary embodiment, the cathode electrolyte layer 13 transmits metal ions to the anode layer 15 through the oxygen blocking layer 14. In such an embodiment, the cathode electrolyte layer 13 may include electrolyte.

In one exemplary embodiment, for example, the electrolyte may be in a solid state and may include high-molecular electrolyte, inorganic electrolyte, or complex electrolyte thereof. In such an embodiment, the electrolyte may be in a bent shape.

In an alternative exemplary embodiment, the electrolyte may be defined by metal salt melted in a solvent.

In such an embodiment, the metal salt may be Li salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or Lithium bis(trifluoromethanesulfonyl)imide ("LiTFSI"). Alternatively, the metal salt may further include another type of metal salt, such as $AlCl_3$, $MgCl_2$, NaCl, KCl, NaBr, KBr, $CaCl_2$, or the like, which may be further added to the Li salt.

The solvent may be any solvent that may dissolve Li salt and metal salt without limit. In one exemplary embodiment, for example, the solvent may include a carbonate-based solvent such as dimethyl carbonate ("DMC"), an ester-based solvent such as methyl acetate, an ether-based solvent such as dibutyl ether, a ketone-based solvent such as cyclohexanone, an amine-based solvent such as trimethylamine, a phosphine-based solvent such as triethylphosphine, or a mixture thereof.

The oxygen blocking layer 14 may effectively prevent an oxygen penetration and have a conductivity with respect to metal ions. The oxygen blocking layer 14 may include a high molecular substance that may be bent. In one exemplary embodiment, for example, the oxygen blocking layer 14 may be a porous separation layer including a felt formed of a polypropylene material, a high molecular felt polyethylene such as a felt formed of polyphenylene sulfide or the lie, a porous film including olefin-based resin such as polypropylene or the like, or a combination thereof.

The oxygen blocking layer 14 and the cathode electrolyte layer 13 may be provided as separated layers. However, electrolyte may be immersed in pores of a porous separation layer having an oxygen blocking function to form the oxygen blocking layer 14 and the cathode electrolyte layer 13 as a single layer. In one exemplary embodiment, for example, polyethylene oxide ("PEO") and LiTFSI may be mixed to form electrolyte and immerse the electrolyte in the pores of the porous separation layer to form the cathode electrolyte layer 13 and the oxygen blocking layer 14 into a single unitary body.

The anode layer 15 may include electrolyte for a propagation of metal ions, a catalyst for oxidation and deoxidation of oxygen, a conductive material, and a binder. In one exemplary embodiment, for example, the electrolyte, the catalyst, the conductive material and the binder may be mixed, a solvent may be added to form anode slurry, and the anode slurry may be coated and dried on the oxygen blocking layer 14 to form the anode layer 15. The solvent may be to the same as a solvent used for forming the electrolyte included in the cathode electrolyte layer 13.

The electrolyte included in the anode layer 15 may selectively include Li salt included in the cathode electrolyte layer 13 and metal salt.

The catalyst may include an oxide of at least one metal selected from platinum (Pt), gold (Au), silver (Ag), manganese (Mn), nickel (Ni) and cobalt (Co).

The conductive material may include a carbonate-based material having a porosity such as carbon black, graphite, activated carbon, carbon fiber, or carbon nano-tube, a conductive metal material having a metal powder form such as copper (Cu) powder, Ag powder, Ni powder, or Al powder, a conductive organic material such as polyphenylene derivative or the like, or a mixture thereof.

The binder may include at least one selected from polytetrafluoroethylene ("PTFE"), polypropylene, poly vinylindene fluoride ("PVDF"), polyethylene and styrene-butadiene rubber.

The gas diffusion layer 16 evenly supplies the purified air A2 to the anode layer 15. However, the gas diffusion layer 16 is a selective element and thus may be omitted from the battery cell module 10.

In an exemplary embodiment, the gas diffusion layer 16 may include at least one selected from a metal, a ceramic, a polymer, and a carbon material having a porous structure. The gas diffusion layer 16 may have a porous structure to smoothly absorb and diffuse the air A2 discharged from the air purification module 20.

In such an embodiment, the metal having the porous structure may include a foam metal having a sponge form or a metal fiber mat.

In such an embodiment, the ceramic having the porous structure may include Mg—Al silicate may be used as.

In such an embodiment, the polymer having the porous structure may include a porous polyethylene or a porous polypropylene.

In such an embodiment, the carbon material having the porous structure may include a carbon paper, a carbon cloth, or a carbon felt.

An exemplary embodiment of the battery cell module 10 included in the metal air battery is not limited to the above-described structure and thus may have various structures.

In the above-described exemplary embodiments, a metal air battery has been described as an example of an electrochemical cell, but the electrochemical cell is not limited thereto. For example, the electrochemical cell may be another type of cell that may generate electric power by using a chemical reaction, e.g., a fuel cell. Here, as air purified by an air purification module is supplied into an anode layer, the chemical reaction of the electrochemical cell may occur.

In an exemplary embodiment, a metal air battery may remove a plurality of impurities from air supplied to a battery cell module to effectively prevent a side reaction caused by impurities. Therefore, energy efficiency and a lifespan of the metal air battery may be improved.

In such an embodiment, the metal air battery may control operations of a plurality of air purifiers based on concentrations of impurities in air flowing from an outside to maximize the operation efficiency of the metal air battery. Therefore, energy efficiency of the metal air battery may be improved.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery comprising:
    a battery cell module which generates electricity using oxidation and deoxidation of metal; and
    an air purification module which communicates fluid to the battery cell module, purifies air flowing from an outside, and supplies the purified air to the battery cell module,
    wherein the air purification module comprises:
        a first air purifier which filters a first impurity of a plurality of impurities in the air flowing from the outside; and
        a second air purifier which filters a second impurity of the plurality of impurities, which is different from the first impurity,
        a concentration detector which detects a concentration of at least one of the plurality of impurities in the air flowing from the outside; and
        a controller which controls operations of the first and second air purifiers based on information detected by the concentration detector,
        wherein the controller controls first electric power for the first air purifier based on the information detected by the concentration detector, and
        the controller controls second electric power for the second air purifier based on the controlled first electric power for the first air purifier.

2. The metal air battery of claim 1, wherein the plurality of impurities comprise at least two selected from water ($H_2O$), carbon dioxide ($CO_2$), and nitrogen ($N_2$).

3. The metal air battery of claim 1, wherein
the second air purifier is disposed between the first air purifier and the battery cell module, and
the second air purifier filters the second impurity from the air passed through the first air purifier.

4. The metal air battery of claim 1, wherein the second air purifier enriches oxygen ($O_2$) to increase a concentration of oxygen ($O_2$) in the air supplied to the battery cell module to be about 21% or more.

5. The metal air battery of claim 1, wherein when the concentration of the at least one of the plurality of impurities detected by the concentration detector increases, the controller increases the first electric power for the first air purifier and decreases the second electric power for the second air purifier.

6. The metal air battery of claim 1, wherein when the concentration of the at least one of the plurality of impurities detected by the concentration detector decreases, the controller decreases the first electric power for the first air purifier and increases the second electric power for the second air purifier.

7. The metal air battery of claim 1, wherein the air purification module further comprises a third air purifier which filters a third impurity of the plurality of impurities, which is different from the first and second impurities.

8. The metal air battery of claim 1, wherein the first and second air purifiers are disposed in a chamber and filter the first and second impurities from air flowing into the chamber.

9. The metal air battery of claim 1, wherein the air purification module operates according to at least one of a pressure swing adsorption method, a temperature swing adsorption method, a pressure temperature swing adsorption method, a vacuum swing adsorption, and a selective separation method.

10. The metal air battery of claim 9, wherein the air purification module comprises at least one selected from an absorbent material and a selective transmission layer.

11. The metal air battery of claim 10, wherein the absorbent material comprises at least one selected from a zeolite, an alumina, a silica gel, a metal-organic framework, a zeolitic imidazolate framework and an activated carbon.

12. The metal air battery of claim 1, wherein the metal air battery is a lithium air battery.

13. A metal air battery comprising:
a battery cell module which generates electricity using oxidation and deoxidation of metal; and
an air purification module which communicates fluid to the battery cell module, purifies air flowing from an outside, and supplies the purified air to the battery cell module,
wherein the air purification module comprises:
a first air purifier which filters a first impurity of a plurality of impurities in the air flowing from the outside;
a second air purifier which filters a second impurity of the plurality of impurities, which is different from the first impurity:
a first connection path which fluid-connects the first air purifier and the second air purifier;
a second connection path which fluid-connects the second air purifier and the battery cell module;
a bypass path which bypasses the second air purifier and fluid-connects the first and second connection paths; and
a flow controller which controls a flow of air supplied into the second air purifier.

14. The metal air battery of claim 13, wherein the flow controller controls a flow of air supplied by the second air purifier to be lower than or equal to a maximum air flow having an oxygen concentration higher than or equal to 95% of a maximum oxygen concentration of air concentrated by the second air purifier.

15. The metal air battery of claim 13, wherein the battery cell module is supplied with air into which air passing through the bypass path and air passing through the second air purifier are mixed.

16. A method of operating the metal air battery of claim 1, the method comprising:
filtering the first impurity of the plurality of impurities in the air flowing from the outside, by the first air purifier; and
filtering the second impurity of the plurality of impurities, which is different from the first impurity, by the second air purifier.

17. The method of claim 16, further comprising:
detecting a concentration of at least one of the plurality of impurities in the air flowing into the air purification module; and
controlling operations of the first and second air purifiers to filter the first and second impurities based on the detected concentration of the at least one of the plurality of impurities.

18. W The method of claim 17, wherein the controlling the operations of the first and second air purifiers comprises:
controlling first electric power for the first air purifier based on the detected concentration of the at least one of the plurality of impurities; and
controlling second electric power for the second air purifier based on the controlled first electric power for the first air purifier.

19. The method of claim 18, wherein when the detected concentration of the at least one of the plurality of impurities increases, the first electric power for the first air purifier increases, and the second electric power for the second air purifier decreases.

20. The method of claim 18, wherein when the detected concentration of the at least one of the plurality of impurities decreases, the first electric power for the first air purifier decreases, and the second electric power for the second air purifier increases.

21. The method of claim 16, wherein the filtering the first impurity and the filtering the second impurity are performed sequentially or simultaneously.

22. The method of claim 16, wherein a portion of air filtered by the first air purifier is supplied into the second air purifier, an other portion of the air filtered by the first air purifier is supplied onto the bypass path, and air filtered by the second air purifier and air passing through the bypass path are mixed to be supplied into a battery cell module.

23. The method of claim 22, wherein a flow of the air supplied into the second air purifier is controlled by a flow controller.

24. The method of claim 23, wherein a flow of air supplied by the second air purifier is controlled by the flow controller to be lower than or equal to a maximum air flow having an oxygen concentration higher than or equal to 95% of a maximum oxygen concentration of air concentrated by the second air purifier.

25. An electrochemical cell comprising:
a battery cell module which generates electricity by using a chemical reaction; and an air purification module which is connected to the battery cell module, purifies air flowing from an outside, and supplies the purified air to the battery cell module, wherein the air purification module comprises:
- a first air purifier which filters a first impurity of a plurality of impurities in the air flowing from the outside; and
- a second air purifier which filters a second impurity of the plurality of impurities, which is different from the first impurity;
- a first connection path which fluid-connects the first air purifier and the second air purifier;
- a second connection path which fluid-connects the second air purifier and the battery cell module;
- a bypass path which bypasses the second air purifier and fluid-connects the first and second connection paths; and
- a flow controller which controls a flow of air supplied into the second air purifier.

* * * * *